US007600800B2

(12) United States Patent
Suzuki

(10) Patent No.: US 7,600,800 B2
(45) Date of Patent: Oct. 13, 2009

(54) STORAGE STRUCTURE AT REAR PART OF VEHICLE INTERIOR

(75) Inventor: Toshiharu Suzuki, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/183,479

(22) Filed: Jul. 31, 2008

(65) Prior Publication Data
US 2009/0033119 A1 Feb. 5, 2009

(30) Foreign Application Priority Data
Aug. 1, 2007 (JP) ............... 2007-200878

(51) Int. Cl.
*B60N 3/12* (2006.01)
(52) U.S. Cl. .................. 296/37.16; 296/37.14
(58) Field of Classification Search .......... 296/37.14, 296/37.16, 181.1
See application file for complete search history.

(56) References Cited

U.S. PATENT DOCUMENTS

| 3,227,488 | A | * | 1/1966 | Kosbab et al. ........... 296/65.06 |
| 5,011,208 | A | * | 4/1991 | Lewallen ................ 296/37.16 |
| 5,056,846 | A | * | 10/1991 | Tanaka ................... 296/37.1 |
| 5,716,091 | A | * | 2/1998 | Wieczorek .............. 296/37.16 |
| 5,947,358 | A | * | 9/1999 | Wieczorek .............. 296/37.16 |
| 5,979,962 | A | * | 11/1999 | Valentin et al. ........... 296/37.1 |
| 6,247,741 | B1 | * | 6/2001 | Seel et al. ............... 296/37.14 |
| 6,253,943 | B1 | * | 7/2001 | Spykerman et al. ........... 220/6 |
| 6,308,873 | B1 | * | 10/2001 | Baldas et al. ............... 224/281 |
| 6,439,633 | B2 | * | 8/2002 | Nemoto .................... 296/37.14 |
| 6,536,843 | B1 | * | 3/2003 | Severinski et al. ........ 296/65.01 |
| 6,644,709 | B2 | * | 11/2003 | Inagaki et al. ............. 296/37.16 |
| 6,779,824 | B1 | * | 8/2004 | Lazarevich et al. ......... 296/37.6 |
| 6,921,119 | B2 | * | 7/2005 | Haspel et al. ............ 296/37.16 |
| 7,090,274 | B1 | * | 8/2006 | Khan et al. .............. 296/37.16 |
| 7,350,681 | B2 | * | 4/2008 | Polburn et al. .......... 296/37.16 |
| 7,393,037 | B2 | * | 7/2008 | Hwang .................... 296/37.14 |
| 7,422,047 | B1 | * | 9/2008 | McDonald ............... 296/37.14 |
| 2002/0179663 | A1 | * | 12/2002 | Moore et al. ................. 224/539 |
| 2003/0090120 | A1 | * | 5/2003 | Barber et al. ............ 296/37.14 |
| 2006/0119138 | A1 | | 6/2006 | Gaiser et al. |
| 2006/0145501 | A1 | * | 7/2006 | Warner et al. .............. 296/37.3 |
| 2009/0033119 | A1 | * | 2/2009 | Suzuki .................... 296/37.14 |

FOREIGN PATENT DOCUMENTS

DE    10 2007 031 591 A1    2/2008

(Continued)

*Primary Examiner*—Kiran B. Patel
(74) *Attorney, Agent, or Firm*—Foley & Lardner LLP

(57) ABSTRACT

A storage structure including: a storage space provided in a luggage floor at a rear part of a vehicle interior; front and rear lid members which cover an upper opening of the storage space, the front lid member being disposed at a front part of the upper opening and having a structure to be opened at a rear end with a front end thereof rotatably connected to a component of a vehicle body, the rear lid member being disposed at the rear of the front lid member; a rotational force generator which generates a rotational force to rotate the front lid member when a forward external force is applied to a rear part of the vehicle body; and a rotation restrictor which restricts a rotation amount of the front lid member rotated by the rotational force generator within a predetermined angular range.

7 Claims, 11 Drawing Sheets

FOREIGN PATENT DOCUMENTS

| | | |
|---|---|---|
| JP | 61 122048 A | 6/1986 |
| JP | 61 249850 A | 11/1986 |
| JP | 62 128848 A | 6/1987 |
| JP | 2001-315581 | 11/2001 |
| WO | WO 98/23465 A | 6/1998 |
| WO | WO 2004/052681 A | 6/2004 |

* cited by examiner

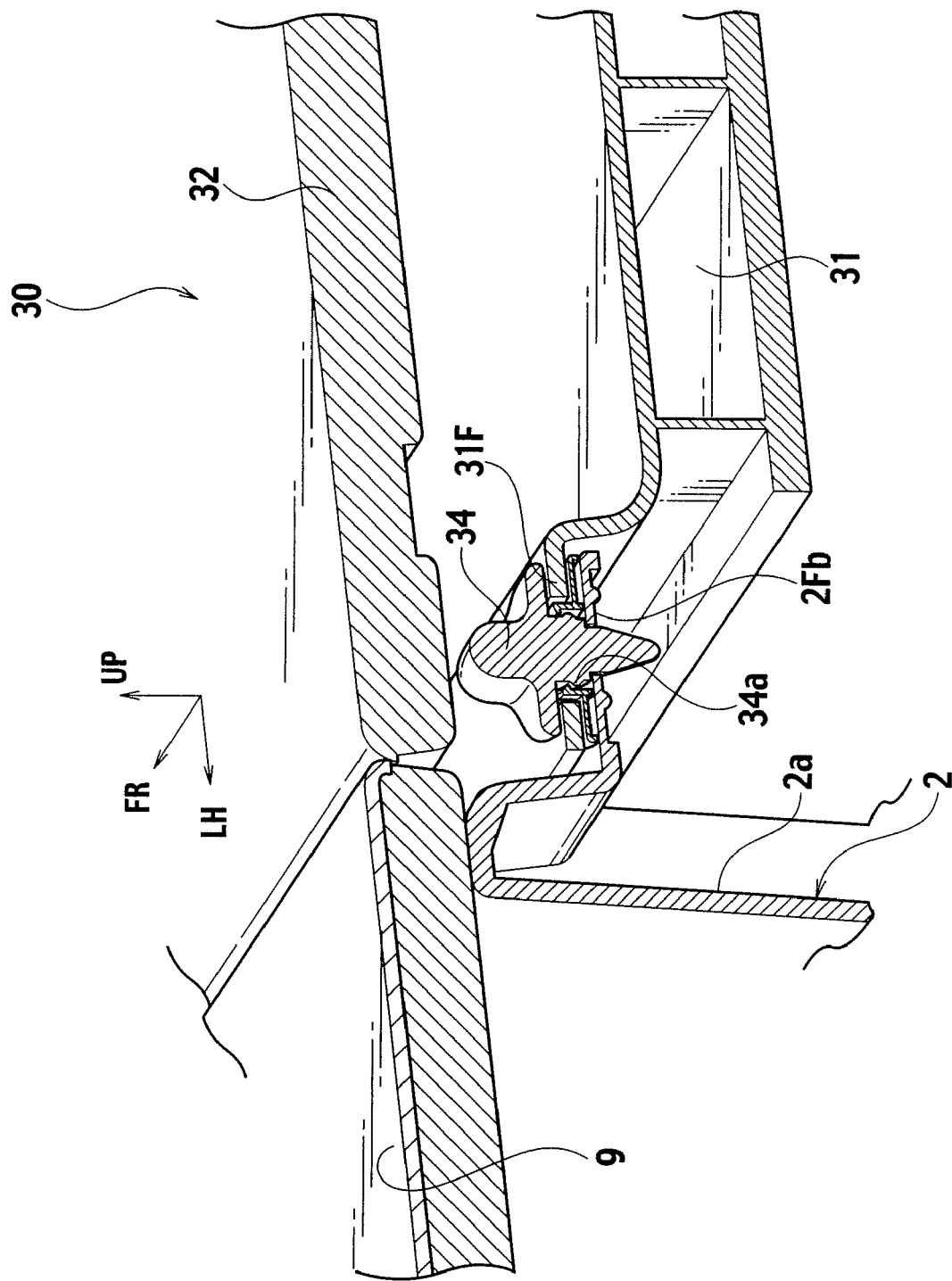

STORAGE STRUCTURE AT REAR PART OF VEHICLE INTERIOR

BACKGROUND OF THE INVENTION

1. Field of the Invention

The present invention relates to a storage structure at a rear part of a vehicle interior wherein an upper opening of a storage space provided in a luggage floor at a rear part of a vehicle interior is covered with a front lid member and a rear lid member.

2. Description of the Related Art

In a vehicle such as an automobile, a luggage space is provided at a rear part of a vehicle interior, for example, behind a rear seat. Japanese Patent Application Laid-open Publication No. 2001-315581 discloses a structure in which a storage space for a spare tire and the like is formed in a luggage floor and an upper opening of the storage space is closed with lid members that also function as a floor board. In this structure, the lid members are split into two pieces.

SUMMARY OF THE INVENTION

However, in the above-described storage structure at a rear part of a vehicle interior, the lid members are simply fitted into the upper opening of the storage space. Accordingly, the lid members may jump out of the opening to a front side of the vehicle if an excessive external force toward the front side of the vehicle is applied to the rear side of the vehicle body due to a rear-end collision or the like.

If the lid members jump out to the front side of the vehicle, the lid members may hit and damage a structural member (such as a seat back of a rear seat) existing in the front side of the storage space.

Particularly in the case of the structure in which the two split lid members are arranged in a front-rear direction to close the upper opening, those split lid members will hit one after the other the structural member (such as the seat back of the rear seat).

Accordingly, it is an object of the present invention to provide a storage structure at a rear part of a vehicle interior, which has a storage space provided in a luggage floor and having an opening closed by lid members arranged in a front-rear direction, and which is capable of suppressing the lid members to jump out forward when an external force is applied to a rear part of a vehicle body.

An aspect of the present invention is a storage structure at a rear part of a vehicle interior comprising: a storage space provided in a luggage floor at a rear part of a vehicle interior, the storage space including an upper opening; a front lid member and a rear lid member which cover the upper opening of the storage space, the front lid member being disposed at a front part of the upper opening and having a structure to be opened at a rear end with a front end of the front lid member connected rotatably to a component of a vehicle body, the rear lid member being disposed at the rear of the front lid member; a rotational force generator which generates a rotational force to rotate the front lid member when an external force directing toward a front part of a vehicle is applied to a rear part of the vehicle body; and a rotation restrictor which restricts a rotation amount of the front lid member being rotated by the rotational force generator within a predetermined angular range.

BRIEF DESCRIPTION OF THE DRAWINGS

The invention will now be described with reference to the accompanying drawings wherein:

FIG. 4 is a cross-sectional perspective view of a portion corresponding to a IV-IV line in FIG. 2.

DESCRIPTION OF THE PREFERRED EMBODIMENTS

Figure 1:
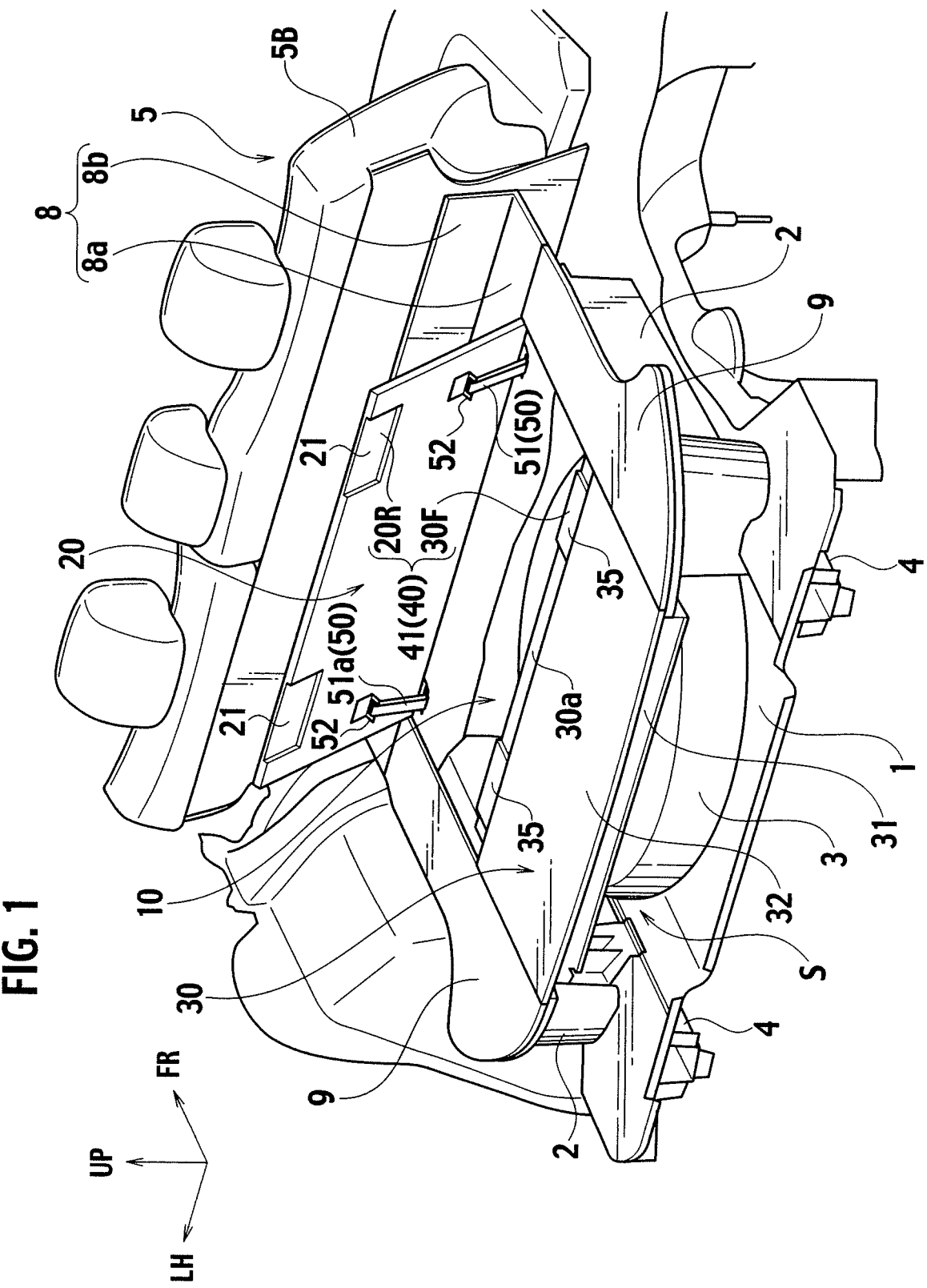
FIG. 1 is a perspective view showing a storage space in a storage structure at a rear part of a vehicle interior according to a first embodiment of the present invention, in which a front lid member is open while a rear lid member is closed.

Embodiments of the present invention will be described below with reference to the drawings. In the drawings, "UP," "FR," and "LH" respectively denote upward, toward the front of a vehicle, and toward the left of the vehicle in the vehicle width direction.

First Embodiment

Figure 2:
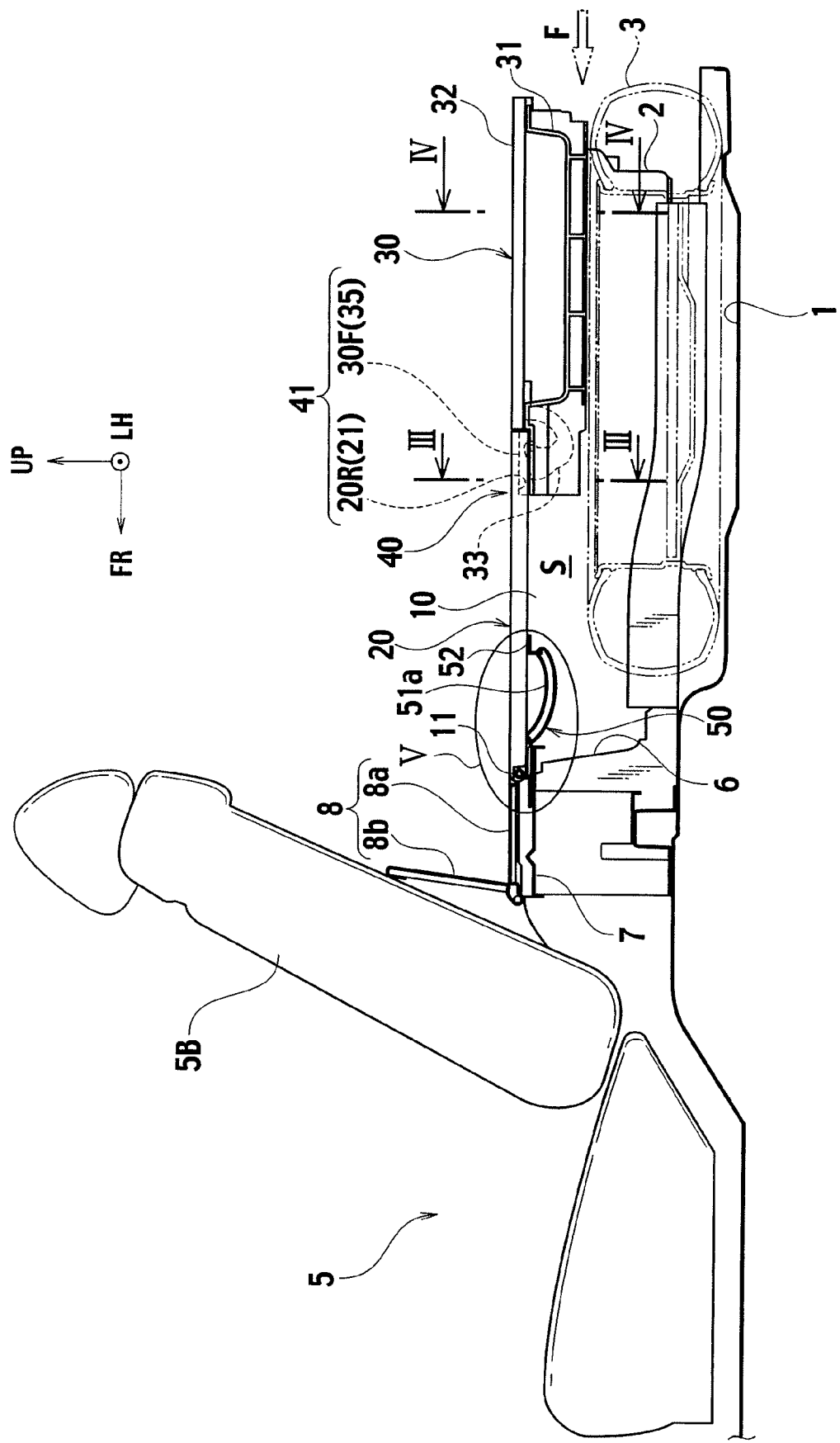
FIG. 2 is a longitudinal cross-sectional view of the storage space in the storage structure at the rear part of the vehicle interior according to the first embodiment of the present invention, in which both of the front lid member and the rear lid member are closed.

As shown in FIGS. 1, 2, and so forth, a storage structure at a rear part of a vehicle interior according to the first embodiment is provided on a luggage floor 1 at a rear part of a vehicle interior. In this storage structure, a storage space S is defined by the luggage floor 1 as a bottom surface and longitudinal walls (inner walls 2a; in FIG. 3) of side storage units 2 disposed on both sides in a vehicle width direction as two side surfaces. In this embodiment, a spare tire 3 is stored in the storage space S.

The luggage floor 1 constitutes a part of a rear floor. A central portion thereof is formed into a concave portion for placing the spare tire 3 therein. The concave portion is set slightly below the both side portions in the vehicle width direction held with a right and left pair of rear side members 4. Moreover, the storage space S is located immediately behind a rear sear 5.

As shown in FIG. 2, a mounting bracket 6 as a component of a vehicle body stands upright from the luggage floor 1 and constitutes a front partition wall of the storage space S in front of the storage space S. Moreover, a front edge bracket 7 as a component of the vehicle body that extends in the vehicle width direction substantially at the same height level as the height of the side storage units 2 is joined to an upper end of this mounting bracket 6. A gap concealer mat 8 for covering a gap between the front edge bracket 7 and a back surface of a seat back 5B of the rear seat 5 is fitted to the front edge bracket 7.

As shown in FIGS. 1 and 2, the gap concealer mat is formed into a substantially L-shape in a cross-sectional view by a covering section 8a having a substantially horizontal and flat upper surface for covering an upper surface of the front edge bracket 7 and an upright section 8b standing upright from a front edge of the covering section 8a and having an upper edge to abut on or to be placed close to the back surface of the seat back 5B.

Moreover, side mats 9 having a predetermined thickness are attached to upper side of the respective side storage units 2. These side mats 9 are disposed to have upper surfaces thereof being almost flush with the upper surface of the covering section 8a of the gap concealer mat 8 so that the side mats 9 and the covering section 8a of the gap concealer mat 8 collectively form a substantially horizontal surface. Moreover, an upper opening 10 of the storage space S is a substantially rectangular upper opening formed on that horizontal surface, which is surrounded by three edges defined by the covering section 8a on the front side and the side mats 9 on the two sides in the vehicle width direction. The upper opening 10 is covered with a front lid member 20 disposed on a front half section thereof and a rear lid member 30 disposed on a rear half section thereof.

In this embodiment, the front lid member 20 is formed with a rectangular flat plate and covers the front half section of the upper opening 10. Meanwhile, the rear lid member 30 is to be disposed to the rear of the front lid member 20 and covers the rear half section of the upper opening 10. The rear lid member 30 is formed by use of a tray 31 and a lid plate 32 for covering an upper aperture of the tray 31. Moreover, as shown in FIG. 2, when the upper opening 10 is closed with the front lid member 20 and the rear lid member 30, an upper surface of the front lid member 20 are disposed almost flush with an upper surface of the lid plate 32 of the rear lid member 30, thereby forming a substantially flat surface together with the upper surfaces of the side mats 9 and of the covering section 8a.

Figure 3:
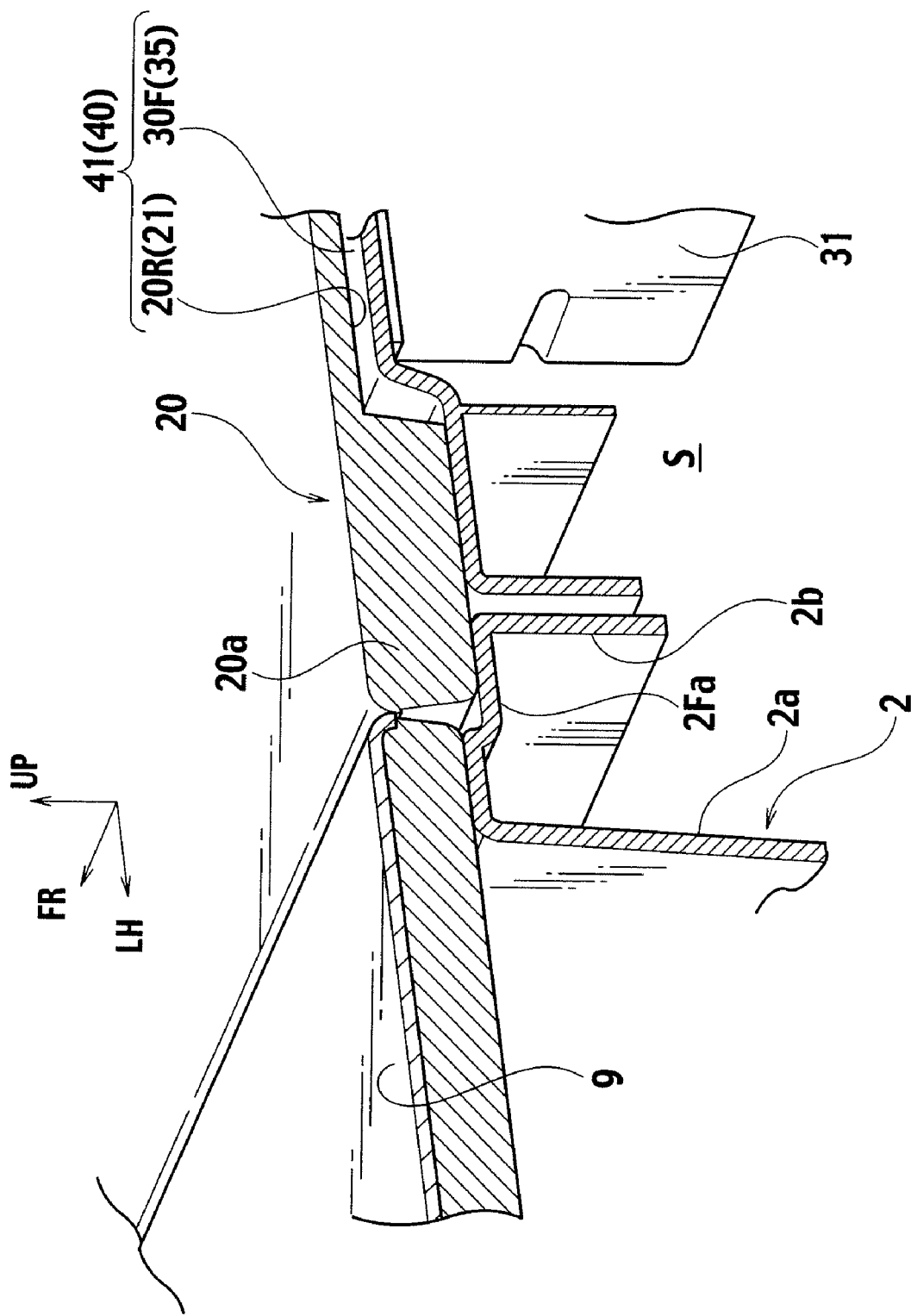
FIG. 3 is a cross-sectional perspective view of a portion corresponding to a III-III line in FIG. 2.

As shown in FIG. 3, when the front lid member 20 is closed, two side edge portions 20a on sides in the vehicle width direction of the front lid member 20 are placed on flanges 2Fa of the inner side walls 2a of the side storage units 2, which are formed by bending upper ends of the inner side walls 2a into the storage space S. Here, an edge of the flange 2Fa is bent downward (to form a bent section 2b) to improve bending rigidity.

Moreover, as shown in FIG. 4, a flange 31F is provided on both sides of the tray 31 in the vehicle width direction. The flanges 31F extend outward from upper ends on both sides of the tray 31 in the vehicle width direction, and are placed on flanges 2Fb of the side storage units 2. Since the flanges 31F of the tray 31 are disposed below the lid plate 32 when the rear lid member 30 is set in its position, the flanges 2Fb of the side storages 2 are set slightly below the flanges 2Fa for placing the front lid member 20.

Figure 6:
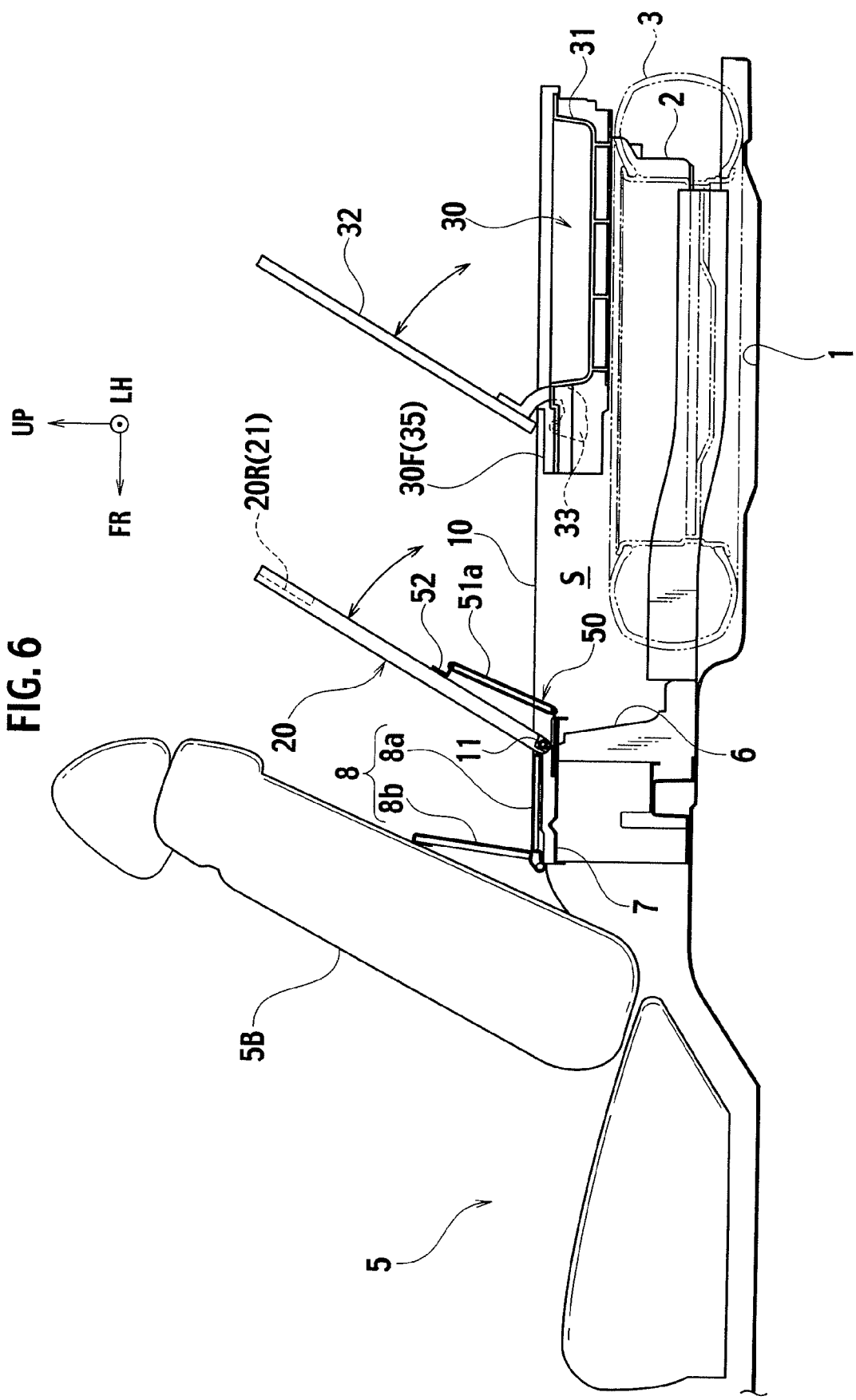
FIG. 6 is a longitudinal cross-sectional view of the storage space in the storage structure at the rear part of the vehicle interior according to the first embodiment of the present invention, in which both of the front lid member and the rear lid member are open.

Moreover, regarding the rear lid member 30, as shown in FIG. 2, a front end of the lid plate 32 is rotatably fitted to a front end of an upper edge of the tray 31 by use of a hinge 33, so that the tray 31 is opened by lifting a rear end of the lid plate 32 from a state of covering a rear half portion of the upper opening 10 with the rear lid member 30 as shown in FIG. 6.

Incidentally, as shown in FIG. 4, the flanges 31F of the tray 31 and the flanges 2Fb of the side storage unit 2 are joined to one another at a rear part of the rear lid member 30 by use of detachable clips 34.

Specifically, insertion holes 34a through which the detachable clip 34 is penetrated are formed on the flanges 31F and 2Fb. The clip 34 is inserted into the insertion hole 34a from above and prevents displacement of the rear lid member 30 attributable to vibration during driving and the like. This clip 34 gets broken when a load exceeding a predetermined level is applied to the rear lid member 30 in the case of a rear-end collision, for example.

Figure 5A:
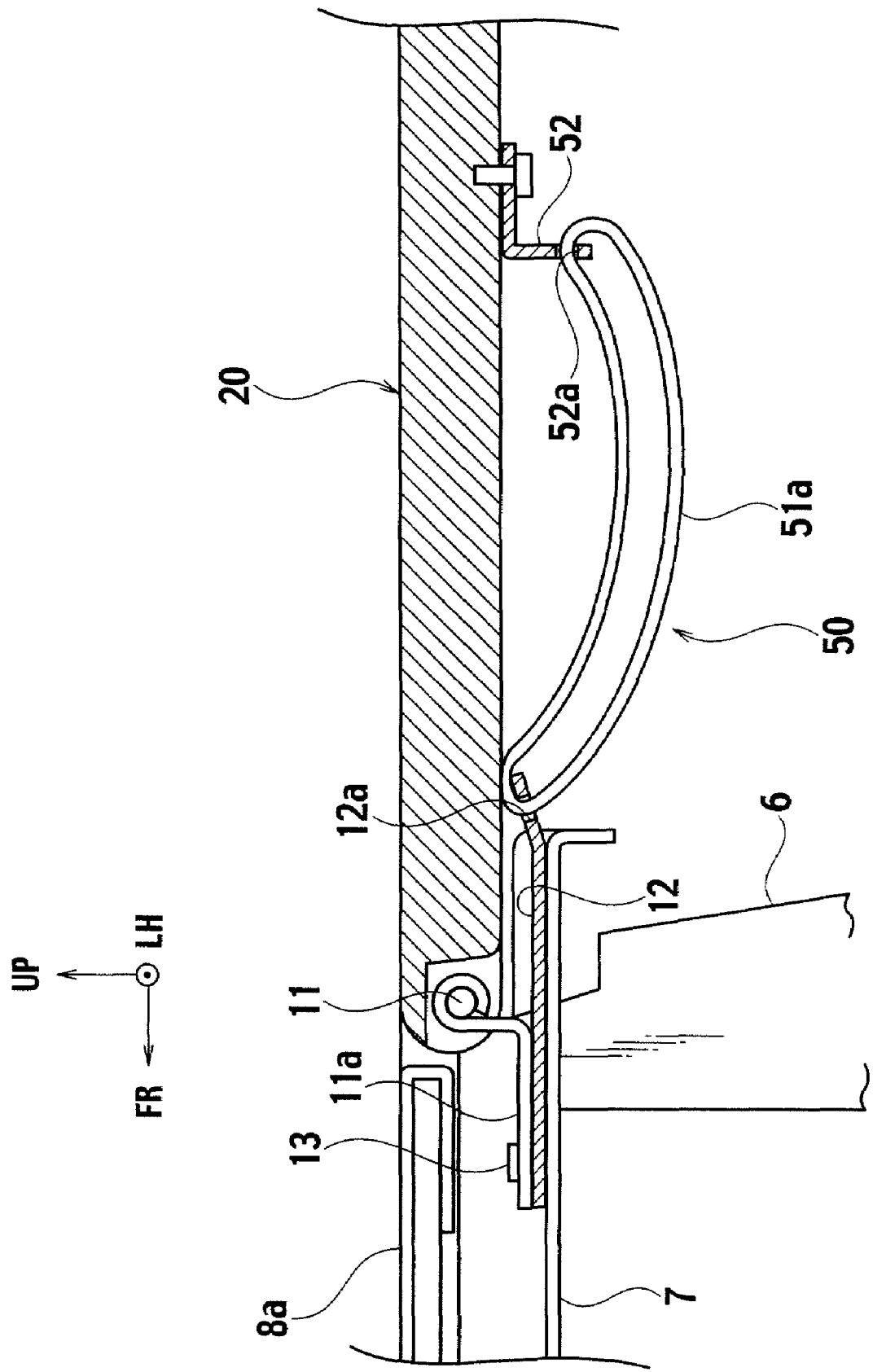
FIG. 5A is an enlarged cross-sectional view of a part V in FIG. 2, which shows a rotation restrictor according to the first embodiment of the present invention.

Here, in this embodiment, as shown in FIG. 2, a front end of the front lid member 20 is rotatably connected to the front edge bracket 7 by use of hinges 11. Here, a rear end of the front lid member 20 is open. That is, as shown in FIG. 6, the front half section of the upper opening 10 is opened by rotating the front lid member 20 pivotally around the hinges 11 and thereby lifting the rear end thereof upward. The pair of hinges 11 are disposed respectively on both ends in the vehicle width direction of the front edge bracket 7 and fixtures 11a of the hinges 11 are fixed to an upper surface of the front edge bracket 7 together with fitting plates 12 as a component of the vehicle body with bolts 13 as shown in FIG. 5A.

Here, the rear half section of the upper opening 10 covered with the rear lid member 30 can be opened by first detaching the clips 34 and then lifting up and detaching the rear lid member 30. Attachment and detachment of the clip 34 is facilitated by making the clip 34 detachable by rotating about an axis of the insertion hole 34a by a predetermined angle (such as 90°).

Figure 7:
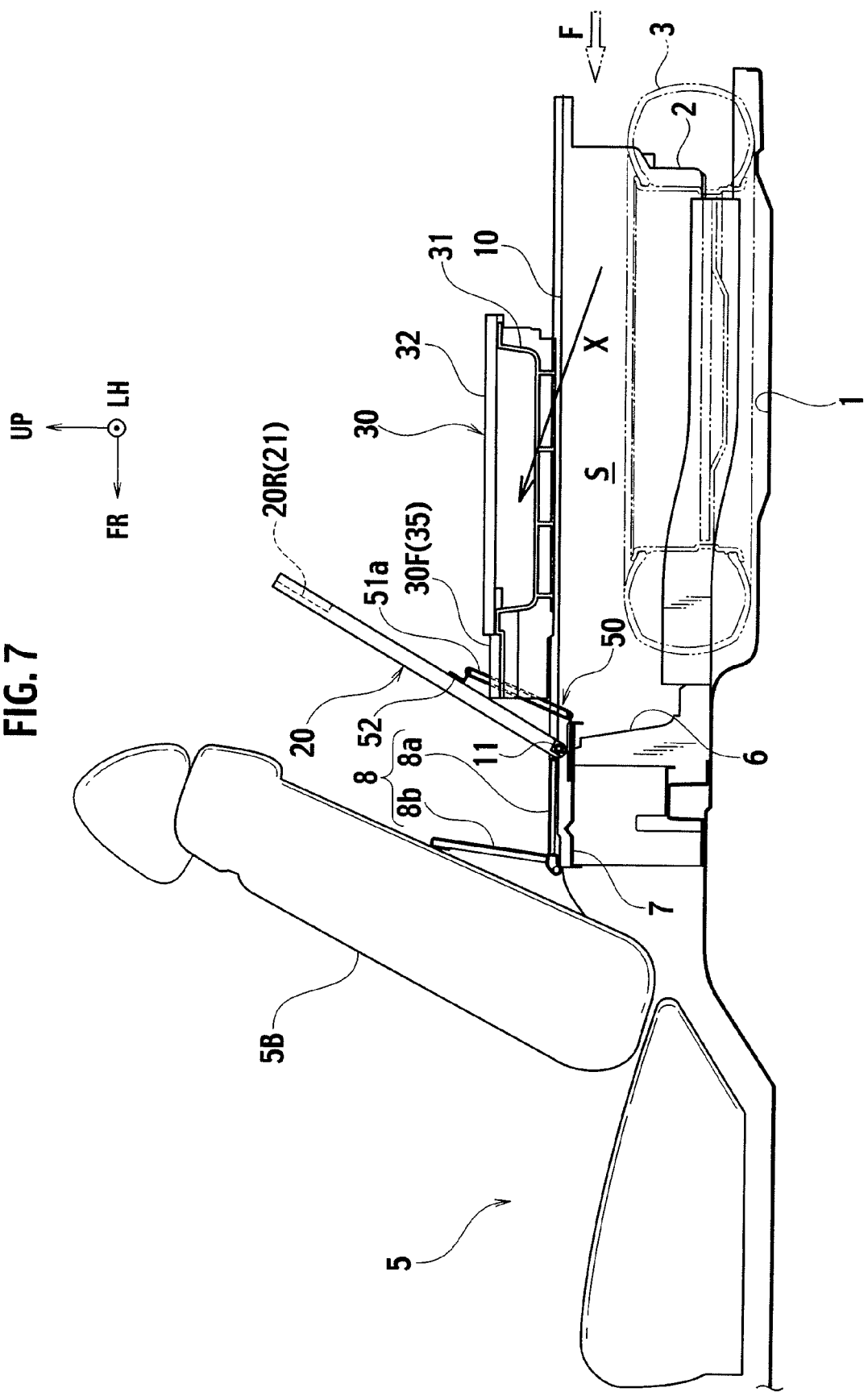
FIG. 7 is a longitudinal cross-sectional view showing behaviors of the front lid member and the rear lid member in the storage structure at the rear part of the vehicle interior according to the first embodiment of the present invention at the time of a rear-end collision.

Here, in this embodiment, a rotational force generator 40 is provided to generate a rotational force for rotating the front lid member 20 when an external force F is applied from the rear end of the vehicle body in a direction toward the front end of the vehicle by a rear-end collision as shown in FIG. 7. Moreover, a rotation restrictor 50 is provided to restrict an rotation amount of the front lid member 20 which is rotated by the rotational force generator 40, within a range of a predetermined angle, so as to allow the rotated front lid member 20 to maintain a distance with an object to be prevented from hitting (which is the seat back 5B of the rear seat 5 in this case).

Moreover, in this embodiment, as shown in FIG. 2 and the like, the rotational force generator 40 applies an overlapped structure 41, in which a lower side surface 20R at the rear end of the front lid member 20 is set on an upper side surface 30F at a front end of the rear lid member 30 (that is, the rear end of the front lid member 20 is placed on the front end of the rear lid member 30 and the lower side surface 20R at the rear end of the front lid member 20 is mated to the upper side surface 30F at the frond end of the rear lid member 30). To be more precise, as shown in FIG. 1, concave portions 21 are formed at two locations arranged in the vehicle width direction on the lower side surface 20R of the rear end of the front lid member 20, and a stepped portion 30a for receiving the rear end of the front lid member 20 is formed on a front edge portion at an upper front end of the tray 31 of the rear lid member 30, which is protruding frontward from the front end of the lid plate 32.

Moreover, convex portions 35 are formed on two locations arranged in the vehicle width direction corresponding to the locations of the concave portions 21, on an upper surface of the stepped portion 30a. The convex portions 35 are to be engaged with the concave portions 21 when the front lid member 20 is closed.

The overlapped structure 41 is provided between the front lid member 20 and the rear lid member 30 as described above. Hence, in a case where whole the rear lid member 30 is pushed forward to the vehicle front side by the external force F from the vehicle rear side, the lower side surface 20R at the rear end of the front lid member 20 moves onto an upper surface of the rear lid member 30 located behind the upper side surface 30F at the front end thereof. Concurrently, the upper side surface 30F at the front end of the rear lid member 30 slides beneath a lower surface of the front lid member 20 located in front of the lower side surface 20R at the rear end thereof. As a consequence, the lower end of the front lid member 20 is pushed upward whereby the front lid member 20 is rotated upward pivotally around the hinges 11 provided at the front end thereof as shown in FIG. 2.

Moreover, as shown in FIG. 5A and the like, the rotation restrictor 50 includes wires 51a as flexible members having a predetermined length, which connect the lower surface of the front lid member 20 to the fitting plate 12 as the component of the vehicle body located below the lower surface.

Specifically, on a rear end of the fitting plate 12 that protrudes from a rear end of the front edge bracket 7, fitting holes 12a for the wires 51a are formed. Meanwhile, as shown in FIG. 1 and FIG. 6, fitting brackets 52 for the wires 51a are fixed to the lower surface of the front lid member 20, at points arranged in the vehicle width direction and located at a certain distance apart from the front end of the front lid member 20. Each of the wires 51a is formed into a link shape and is inserted to the fitting hole 12a of the fitting plate 12 and a fitting hole 52a of the fitting bracket 52.

As shown in FIG. 2, the wires 51a are loosened when the front lid member 20 is closed. On the other hand, as shown in FIG. 6, the wires 51a are tensed when the front lid member 20 is rotated at a predetermined rotation angle (at the maximum angle within an angular range that allows the front lid member 20 to maintain the distance with the object to be prevented from hitting, for example) to open the front half section of the upper opening 10. Accordingly, the rotation amount of the front lid member 20 is restricted within the predetermined angular range with the wires 51a.

According to the above-described storage structure at a rear part of a vehicle interior of the first embodiment, the front lid member 20 is to be opened at the rear end thereof and is provided with the rotational force generator 40 and the rotation restrictor 50. Therefore, when the external force F is applied to the rear part of the vehicle body by a rear-end collision, the front lid member 20 is rotated pivotally around the hinges 11 with the rotational force generator 40 and the amount of the rotation of the front lid member 20 is restricted within a predetermined angular range with the rotation restrictor 50. Accordingly, the front lid member 20 is allowed to maintain a distance away from the object to be prevented from hitting. In this way, it is possible to suppress the front lid member 20 to jump out forward.

Moreover, as shown in FIG. 7, when the clips 34 are broken by the external force F directing toward the front part of the vehicle, the rear lid member 30 jumps out obliquely forward, or in a direction toward the front part of the vehicle and upward as shown in an arrow X in the drawing. Here, the front lid member 20 being rotated by the predetermined angle and being set to the upright state, functions as a shield for receiving the rear lid member 30 that is moving forward. Therefore, the storage structure at a rear part of a vehicle interior of the first embodiment also prevents the rear lid member 30 from jumping out forward.

Therefore, the storage structure of the first embodiment prevents the front lid member 20 and the rear lid member 30 from jumping out forward at the time of the rear-end collision and hitting the rear surface of the seat back 5B of the rear seat located in front of the storage space S. In this way, it is possible to suppress damages on these lid members.

Moreover, according to this embodiment, the rotational force generator 40 can be formed relatively simply by applying the overlapped structure 41 in which the lower side surface 20R at the rear end of the front lid member 20 overlaps the upper side surface 30F at the front end of the rear lid member 30.

Further, the rotation restrictor 50 can be formed relatively simply by use of the wire 51a having a predetermined length, which connects the lower surface of the front lid member 20 to the fitting plate 12 located below the lower surface, and restricts the rotation amount of the front lid member 20 by the tension thereof. Moreover, by applying this configuration, the forward moving force of the rear lid member 30 received with the front lid member 20 can be dispersed into the component of the vehicle body through the wires 51a. In this way, it is possible to suppress breakage of the hinges 11 on the front lid member 20 and to suppress detachment of the front lid member 20 from the component of the vehicle body (the front edge bracket 7).

Figure 5B:
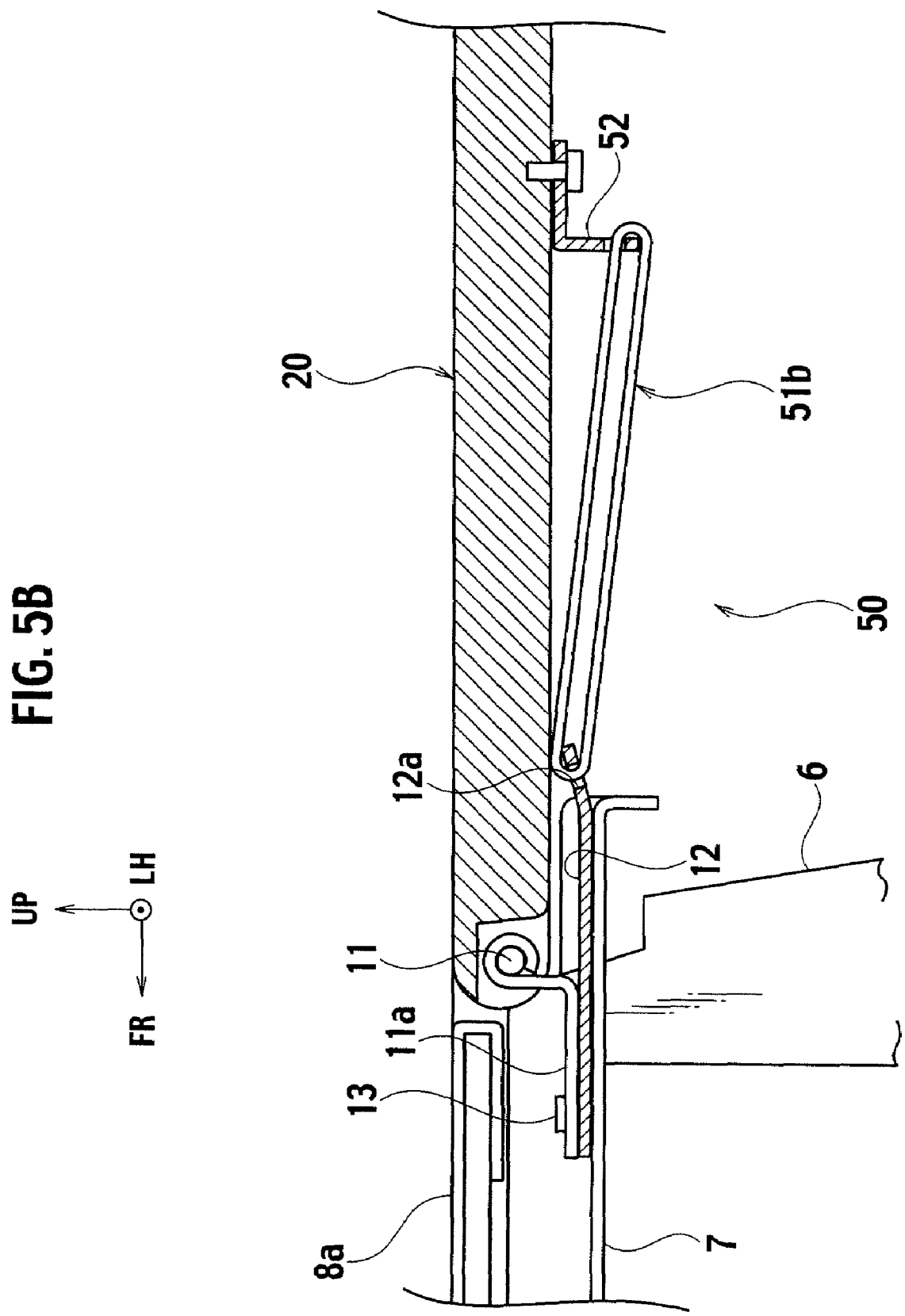
FIG. 5B is a view corresponding to FIG. 5A, which shows another example of the rotation restrictor according to the first embodiment of the present invention.

Incidentally, instead of the above-described wires 51a as the flexible members, as shown in FIG. 5B, it is also possible to form the rotation restrictor 50 with elastic members 51b which has a predetermined length at a maximum elongation thereof and connects the lower surface of the front lid member 20 to the component of the vehicle body 12 located below the lower surface. The predetermined length of the elastic members 51b corresponds to the length of the elastic members 51b at the maximum elongation thereof, and the elastic members 51b reach the maximum elongation when the front lid member 20 is rotated by a predetermined rotation angle to open the front half section of the upper opening 10.

In this case, the elastic member may be an elastic body having an elasticity limit such as a rubber cord, a pipe applying a nested structure (such as an expandable rod), and so forth. In any case, the elastic member only needs to be able to transfer a load at the time of maximum elongation and thereby to restrict the forward motion of the rear lid member 30.

Meanwhile, instead of the wires 51a, a link provided with a bendable joint may also be applied to the flexible member as the rotation restrictor 50.

Second Embodiment

Figure 8:
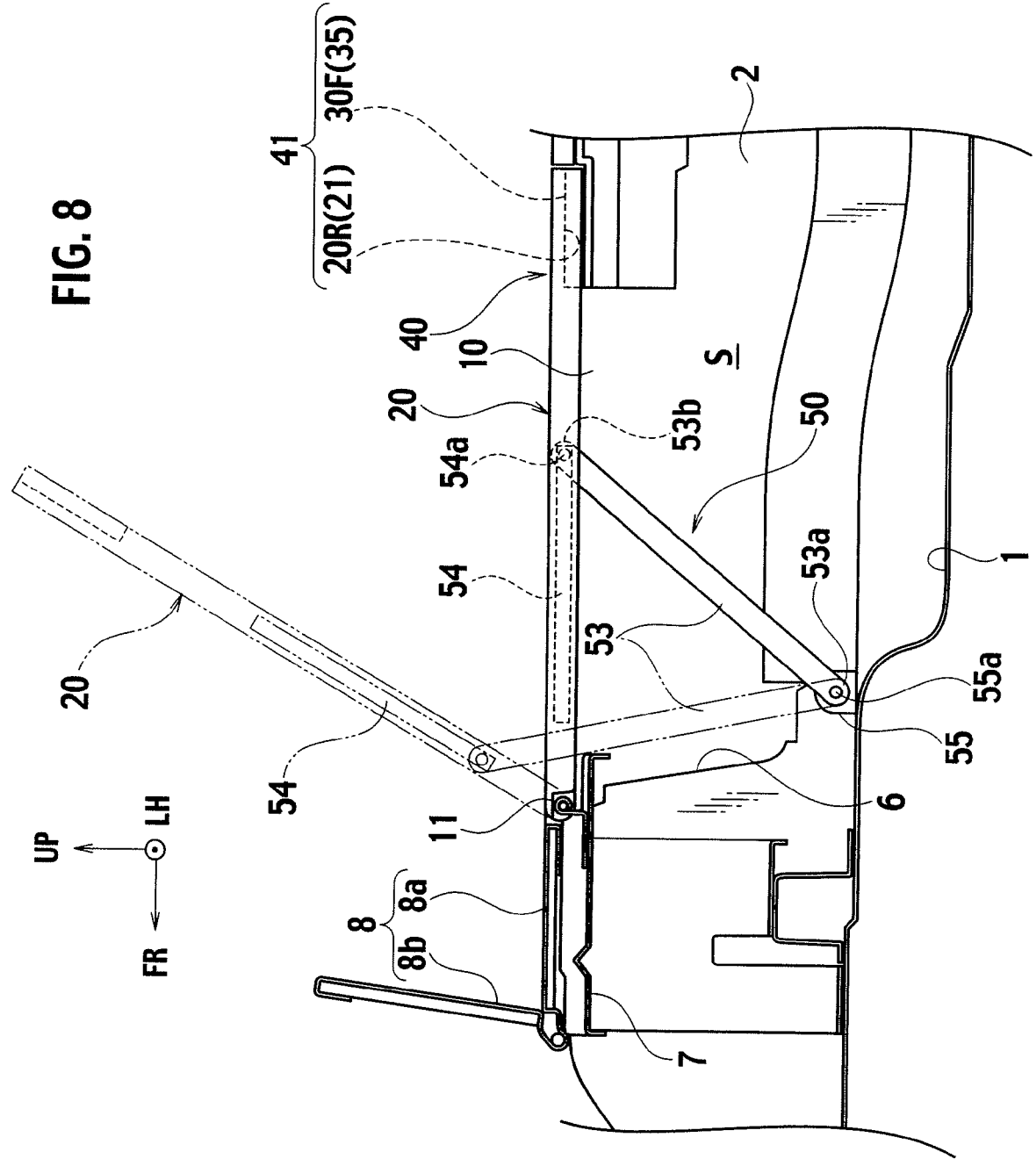
FIG. 8 is a cross-sectional side view showing substantial part of a rotation restrictor of a front lid member in a storage structure at a rear part of a vehicle interior according to a second embodiment of the present invention.

FIG. 8 is a cross-sectional side view showing substantial part of a rotation restrictor of a front lid member in a storage structure at a rear part of a vehicle interior according to the second embodiment. Note that the storage structure at a rear part of a vehicle interior of this embodiment includes constituents that are similar to those in the above-described first embodiment. Accordingly, in the following description, those similar constituents will be shown with similar reference numerals and duplication explanation thereof will be omitted.

In the storage structure at a rear part of a vehicle interior of the second embodiment, as similar to the first embodiment, the front end of the front lid member 20 is rotatably connected to the front edge bracket 7 through the hinges 11 so that the rear end thereof is opened. Moreover, the overlapped structure 41 is formed between the rear end of the front lid member 20 and the front end of the rear lid member 30 as the rotational force generator 40.

In addition, the rotation restrictor 50 for restricting the rotation amount of the front lid member 20 within a predetermined angular range is also provided. Here, in this embodiment, the rotation restrictor 50 includes arms 53 as connecting members. The arms 53 connect the lower surface of the front lid member 20 to the luggage floor 1 as the component of the vehicle body located below the lower surface. The arm 53 is connected slidably in the front-rear direction by a predetermined length relative to either the front lid member 20 or the luggage floor 1, while maintaining a predetermined length to a junction with at least any of the front lid member 20 and the luggage floor 1.

Specifically, guide sections 54 having a predetermined length and extending in the front-rear direction of the vehicle are formed on both sides in the vehicle width direction on the lower surface of the front lid member 20. Meanwhile, lower ends 53a of the arms 53 are connected rotatably in the front-rear direction to a bracket 55 which is fixed to the luggage floor 1 in positions immediately below the vicinities of front ends of the guide sections 54 by use of rotatable shafts 55a. Moreover, upper ends 53b of the arms 53 are connected to the front lid member 20 through sliders 54a, which are engaged slidably in the front-rear direction across the entire length of the guide sections 54. When the front lid member 20 is closed, the sliders 54a are located at rear ends of the guide sections 54. When the front lid member 20 is rotated by the predetermined rotation angle to open the front half section of the upper opening 10, the sliders 54a are located at the front ends of the guide sections 54

Therefore, according to the storage structure at a rear part of a vehicle interior according to this embodiment, the rotational force generator 40 and the rotation restrictor 50 obviously exert similar operational effects to those in the first embodiment.

In addition thereto, according to this embodiment, the rotation restrictor 50 includes the arms 53 of which the upper ends 53b are connected to the front lid member 20 through the sliders 54a that are provided on the lower surface of the front lid member 20 and are engaged with the guide sections 54 having the predetermined length slidably in the front-rear direction at the predetermined length, and the lower ends 53a are connected rotatably in the front-rear direction to the luggage floor 1. Therefore, as the sliders 54a are stopped and prevented from moving further forward by the front ends of the guide sections 54, it is possible to suppress excessive rotation of the arms 53 and thereby to restrict the rotation of the front lid member 20 more reliably.

Moreover, in this embodiment, when the front lid member 20 receives the rear lid member 30 that moves forward, the load is obviously dispersed into the component of the vehicle body through the arms 53.

Third Embodiment

Figure 9:
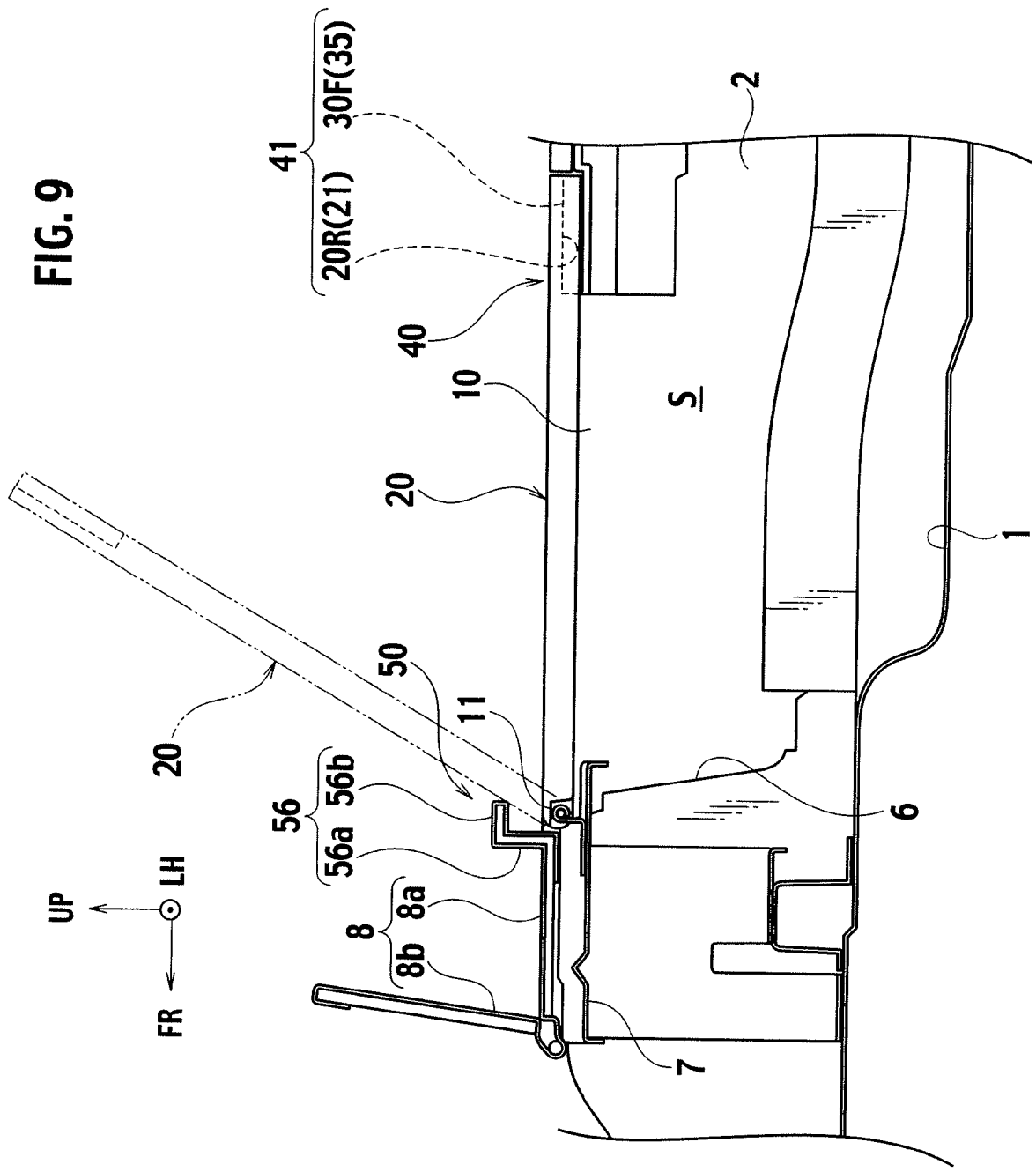
FIG. 9 is a cross-sectional side view showing substantial part of a rotation restrictor of a front lid member in a storage structure at a rear part of a vehicle interior according to a third embodiment of the present invention.

FIG. 9 is a cross-sectional side view showing substantial part of a rotation restrictor of a front lid member in a storage structure at a rear part of a vehicle interior according to the third embodiment. Note that the storage structure at a rear part of a vehicle interior of this embodiment includes constituents that are similar to those in the above-described first embodiment. Accordingly, in the following description, those similar constituents will be shown with similar reference numerals and duplication explanation thereof will be omitted.

In the storage structure at a rear part of a vehicle interior of this embodiment, as similar to the first embodiment, the front lid member 20 applies the structure to be opened at the rear end. Moreover, the overlapped structure 41 is formed between the rear end of the front lid member 20 and the front end of the rear lid member 30 as the rotational force generator 40.

In addition, the rotation restrictor 50 for restricting the rotation amount of the front lid member 20 within a predetermined angular range is also provided. Here, in this embodiment, the rotation restrictor 50 includes a stopper member 56 which protrudes above the front lid member 20 from the gap concealer mat 8 as a component of the vehicle body so as to abut on the front lid member 20 in a predetermined rotational position of the front lid member 20. In the predetermined rotational position, the front lid member 20 is rotated by a predetermined rotation angle (such as a maximum angle within an angular range where the front lid member 20 can maintain a certain distance away from the object to be prevented from hitting) thereby opening the front half section of the upper opening 10.

Specifically, at a rear end of the covering section 8a of the gap concealer mat 8, the stopper member 56 is provided. The stopper member 56 is formed in a substantially L-shape which includes a vertical section 56a formed by bending the rear edge portion of the covering section 8a vertically upward at a predetermined length from the rear edge, and a horizontal section 56b formed by bending an upper end of the vertical section 56a at a predetermined length from the base end of the vertical section 56a and extending toward the rear end of the vehicle.

Moreover, as shown in a chain double-dashed line in the drawing, an edge of the horizontal section 56b of the stopper member 56 abuts on the upper surface of the front lid member 20 at the point where the front lid member 20 is rotated by the predetermined angle pivotally around the hinges 11, thereby suppressing excessive rotation of the front lid member 20. Here, in order to obtain an intended function, the stopper member 56 is made of a material having relatively high rigidity, such as metal or synthetic resin, to avoid buckling and other troubles when the front lid member 20 abuts thereon. Moreover, the stopper member 56 is fixed to the component of the vehicle body.

Therefore, the storage structure at a rear part of a vehicle interior of this embodiment obviously exerts similar operational effects to those in the first embodiment. Moreover, since the rotation restrictor 50 includes the stopper member 56 which abuts on the front lid member 20 in the predetermined rotational position of the front lid member 20. Accordingly, it is possible to restrict rotation of the front lid member 20 more reliably with the stopper member 56 provided directly from the component of the vehicle body and to disperse the load from the rear lid member 30 received with the front lid member 20 into the component of the vehicle body through the stopper member 56.

Fourth Embodiment

Figure 10:
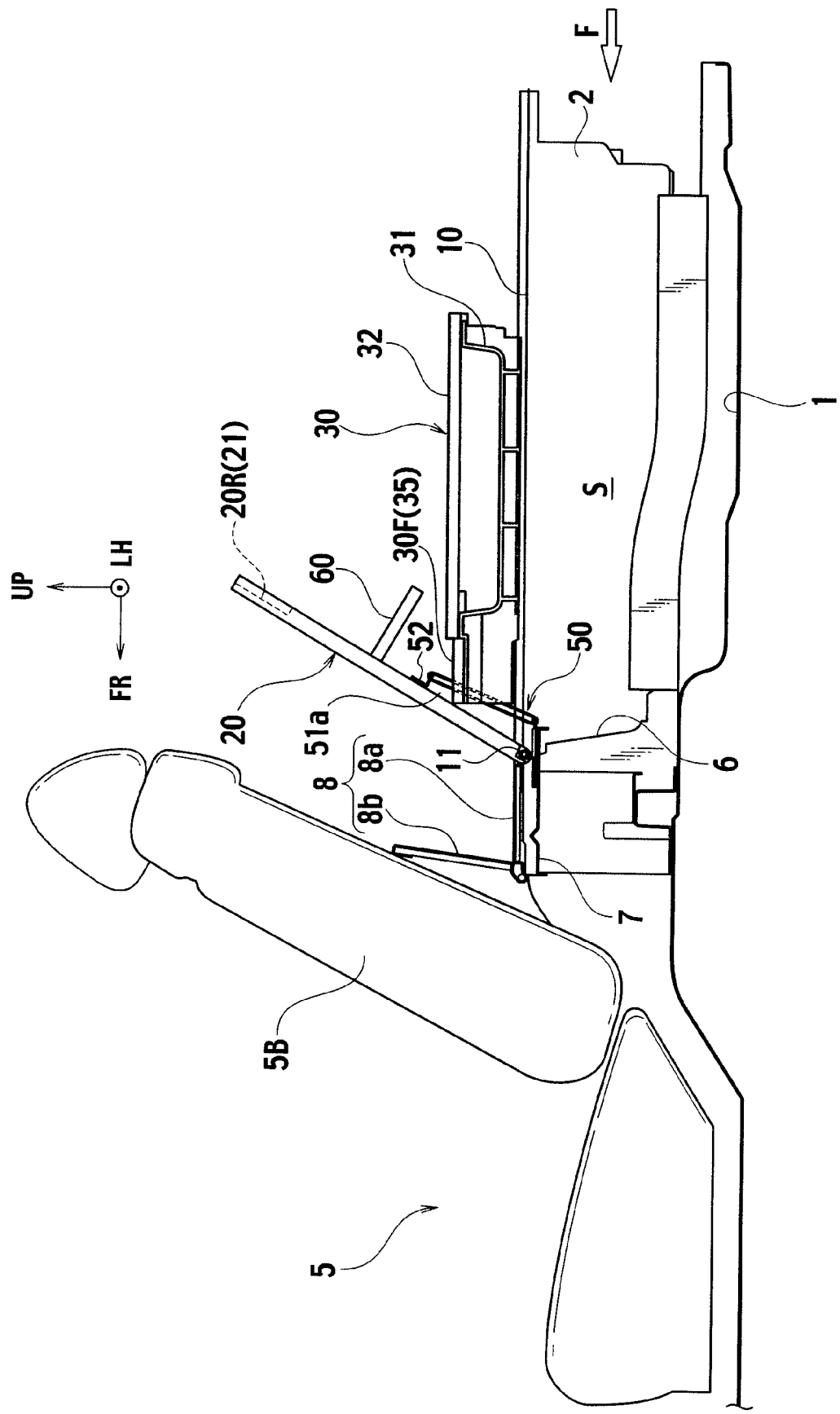
FIG. 10 is a longitudinal cross-sectional view showing behaviors of a front lid member and a rear lid member in a storage structure at a rear part of a vehicle interior according to a fourth embodiment of the present invention at the time of a rear-end collision.

FIG. 10 is a longitudinal cross-sectional view showing behaviors of a front lid member and a rear lid member in a storage structure at a rear part of a vehicle interior according to the forth embodiment at the time of a rear-end collision. Note that the storage structure at a rear part of a vehicle interior of this embodiment includes constituents that are similar to those in the above-described first embodiment.

Accordingly, in the following description, those similar constituents will be shown with similar reference numerals and duplication explanation thereof will be omitted.

The storage structure at a rear part of a vehicle interior of this embodiment includes a receiver member 60 in addition to the configuration similar to the first embodiment. The receiver member 60 projects from the lower surface of the front lid member 20 substantially perpendicularly thereto (or in a vertically downward direction when the front lid member 20 is closed) by a predetermined length. Moreover, the receiver member 60 is provided on the lower surface of the front lid member 20 so as to extend in the vehicle width direction.

This receiver member 60 is formed into a strip shape having a predetermined thickness and is joined to a substantially central position in the front-rear direction of the front lid member 20. The predetermined length of the receiver member 60 is determined as the sufficient length for allowing the receiver member 60 to stop the rear lid member 30 and to prevent the rear lid member 30 from moving further upward when the rear lid member 30 jumps out from the attachment position and hits the front lid member 20 at the time of a rear-end collision. Meanwhile, the predetermined thickness of the receiver member 60 is determined as the thickness for providing sufficient rigidity to suppress the upward motion of the rear lid member 30.

Therefore, according to the storage structure at a rear part of a vehicle interior of this embodiment, as shown in FIG. 10, in the state where the front lid member 20 is rotated by the predetermined angle with the rotational force generator 40 and the rotation restrictor 50 at the time of a rear-end collision, the receiver member 60 is extended from the front lid member 20 toward the rear part of the vehicle.

Accordingly, when the rear lid member 30 jumps out toward the front part of the vehicle body and hits the front lid member 20 due to a rear-end collision, the receiver member 60 stops the rear lid member 30 and prevents the rear lid member 30 from moving further upward. Thus the receiver member 60 can more reliably prevent the rear lid member 30 from moving beyond the front lid member 20 and hitting the seat back 5B of the rear seat 5.

Incidentally, as mentioned above, when the front lid member and the rear lid member are set to cover the storage space, the upper surfaces of the front lid member and the rear lid member are disposed substantially horizontally. Therefore, a space above the storage space covered with the front lid member and the rear lid member can be another useful luggage compartment.

Furthermore, it is an advantage that the rear lid member is configured with a tray and a lid plate covering the opening of the tray, and therefore the rear lid member itself is used efficiently as storage.

Moreover, when the mounting bracket provided on the front side of the storage space is set higher than the height of the spare tire stored in the storage space, it is possible to suppress forward motion of the spare tire associated with the external force applied to the rear part of the vehicle body by using the mounting bracket.

Moreover, when the rear part of the rear lid member is detachably fastened with the clips which are breakable by application of the external force, the rear lid member is rotated upward pivotally around the clip until the clip gets broken, thereby promoting rotation of the front lid member. In addition, it is possible to relax an impact, absorbing the impact energy by the breakage of the clip.

The preferred embodiments described herein are illustrative and not restrictive, and the invention may be practiced or embodied in other ways without departing from the spirit or essential character thereof. For example, in the respective embodiments described above, the rotational force generator 40 is formed as the overlapped structure 41 of the lower side surface 20R at the rear end of the front lid member 20 and the upper side surface 30F at a front end of the rear lid member 30. Instead, it is also possible to provide a detector (such as an acceleration sensor) for detecting an external force from a rear part of a vehicle, and a drive unit (such as a motor having a reducer mechanism or a cylinder having a gas inflator) for rotating the front lid member 20 when the detector detects the external force. The scope of the invention being indicated by the claims, and all variations which come within the meaning of claims are intended to be embraced herein.

The present disclosure relates to subject matters contained in Japanese Patent Application No. 2007-200878, filed on Aug. 1, 2007, the disclosures of which is expressly incorporated herein by reference in its entirety.

What is claimed is:

1. A storage structure at a rear part of a vehicle interior comprising:
    a storage space provided in a luggage floor at a rear part of a vehicle interior, the storage space including an upper opening;
    a front lid member and a rear lid member which cover the upper opening of the storage space, the front lid member being disposed at a front part of the upper opening and having a structure to be opened at a rear end with a front end of the front lid member connected rotatably to a component of a vehicle body, the rear lid member being disposed at the rear of the front lid member;
    a rotational force generator which generates a rotational force to rotate the front lid member when an external force directing toward a front part of a vehicle is applied to a rear part of the vehicle body; and
    a rotation restrictor which restricts a rotation amount of the front lid member being rotated by the rotational force generator within a predetermined angular range.

2. The storage structure at a rear part of a vehicle interior according to claim 1,
    wherein the rotational force generator has an overlapped structure in which a lower side surface at a rear end of the front lid member overlaps an upper side surface at a front end of the rear lid member.

3. The storage structure at a rear part of a vehicle interior according to claim 1,
    wherein the rotation restrictor is a flexible member having a predetermined length and connecting a lower surface of the front lid member to a component of the vehicle body located below the lower surface.

4. The storage structure at a rear part of a vehicle interior according to claim 1,
    wherein the rotation restrictor is an elastic member which has a predetermined length at a maximum elongation thereof and connects a lower surface of the front lid member to a component of the vehicle body located below the lower surface.

5. The storage structure at a rear part of a vehicle interior according to claim 1,
    wherein the rotation restrictor is a connecting member connecting a lower surface of the front lid member to the luggage floor located below the lower surface, the connecting member being connected slidably in a front-rear direction by a predetermined length to at least one of the front lid member and the luggage floor.

6. The storage structure at a rear part of a vehicle interior according to claim 1, wherein the rotation restrictor is a stopper member protruding above the front lid member from a component of the vehicle body and to abut on the front lid member in a predetermined rotational position of the front lid member.

7. The storage structure at a rear part of a vehicle interior according to claim 1, further comprising:

a receiver member extending in a vehicle width direction on a lower surface of the front lid member and projecting substantially orthogonally by a predetermined length from the front lid member.

* * * * *